United States Patent [19]
Thomas

[11] Patent Number: 4,979,021
[45] Date of Patent: Dec. 18, 1990

[54] OPTICAL CHROMAKEY FIELD

[76] Inventor: Milton L. Thomas, 1686 Pineridge Dr., Atlanta, Ga. 30324

[21] Appl. No.: 443,139

[22] Filed: Nov. 30, 1989

[51] Int. Cl.$^5$ .......................... H04N 9/75; H04N 5/222
[52] U.S. Cl. ...................................... 358/22; 358/185; 352/88; 362/16
[58] Field of Search ............... 358/1, 22, 185; 362/16, 362/17, 230, 311; 352/88

[56] References Cited

U.S. PATENT DOCUMENTS

| | | | |
|---|---|---|---|
| 2,314,680 | 3/1943 | Batsel | 358/185 |
| 2,323,754 | 7/1943 | Oliver | 352/88 |
| 2,797,612 | 7/1957 | Holmes | 358/185 |
| 2,962,547 | 11/1960 | Douglas | 358/185 |
| 2,977,850 | 4/1961 | Vanstrum | 358/185 |

Primary Examiner—John W. Shepperd
Attorney, Agent, or Firm—Jones, Askew & Lunsford

[57] ABSTRACT

A method and apparatus for causing a video camera to produce a video signal to selectively cue special effects, comprising an optical chromakey field including a transparent assembly an illumination apparatus. The transparent assembly is placed in the field of view of the video camera. The on-camera talent can see through the transparent assembly to view a monitor or other object located behind the transparent assembly. The illumination apparatus selectively illuminates the transparent assembly. The transparent assembly presents light of a certain color for reception by the video camera. When special effects are selected, the video camera produces a characteristic video signal operative to cue the special effects.

17 Claims, 3 Drawing Sheets

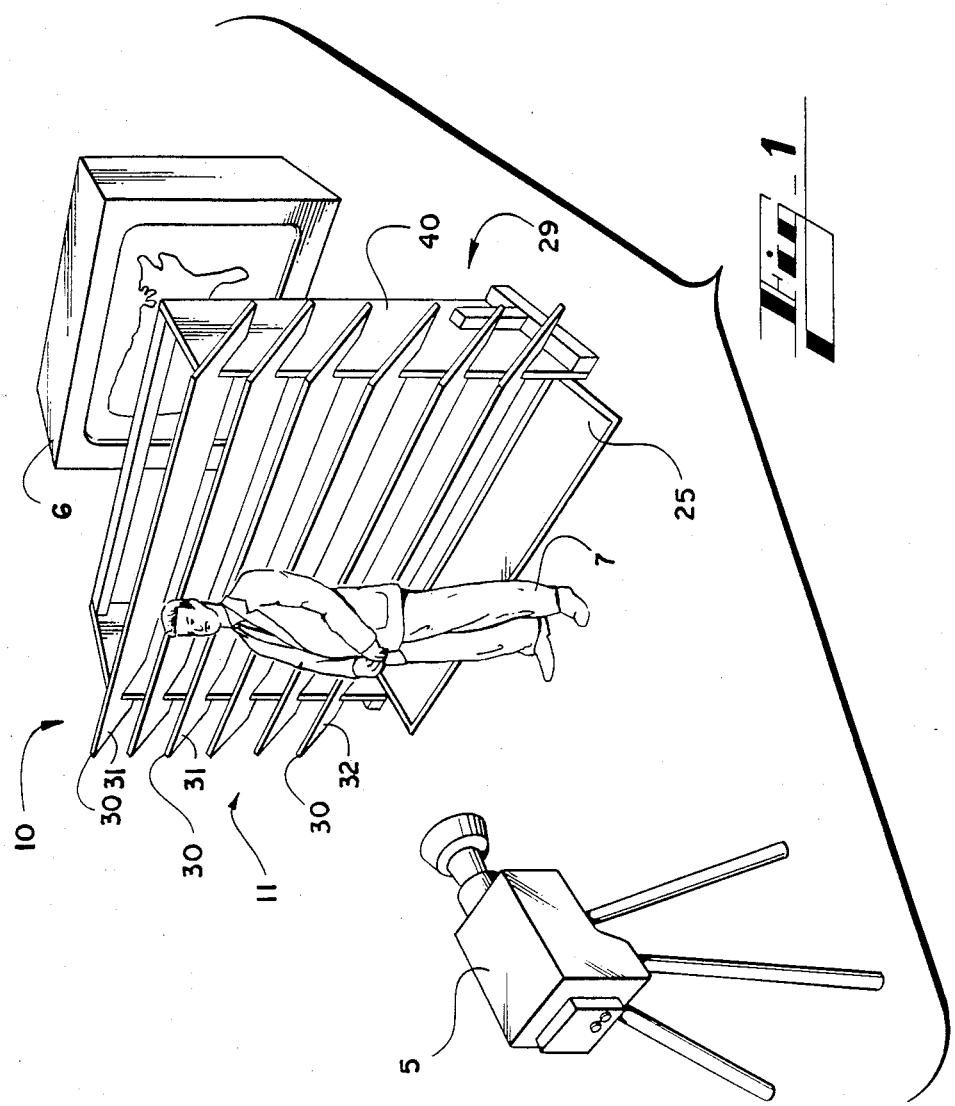

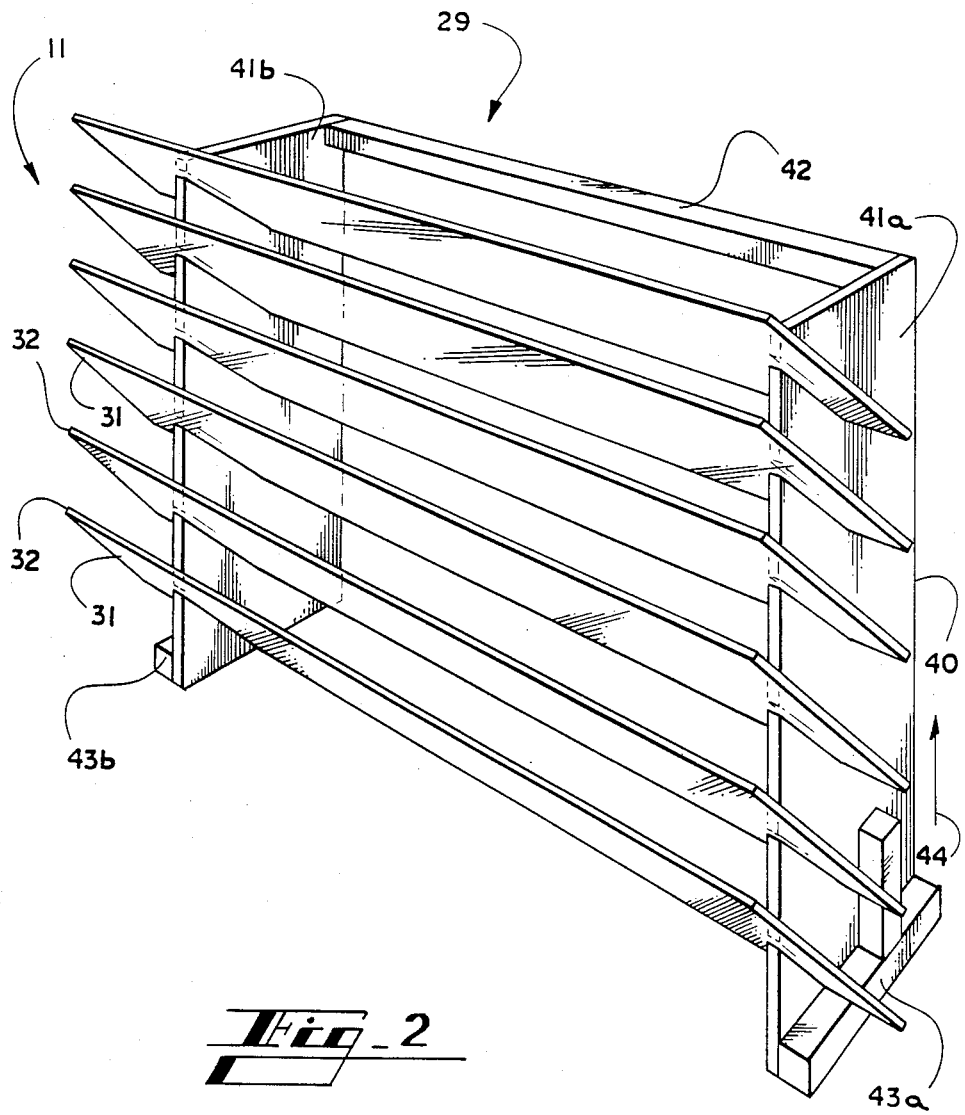
Fig_2

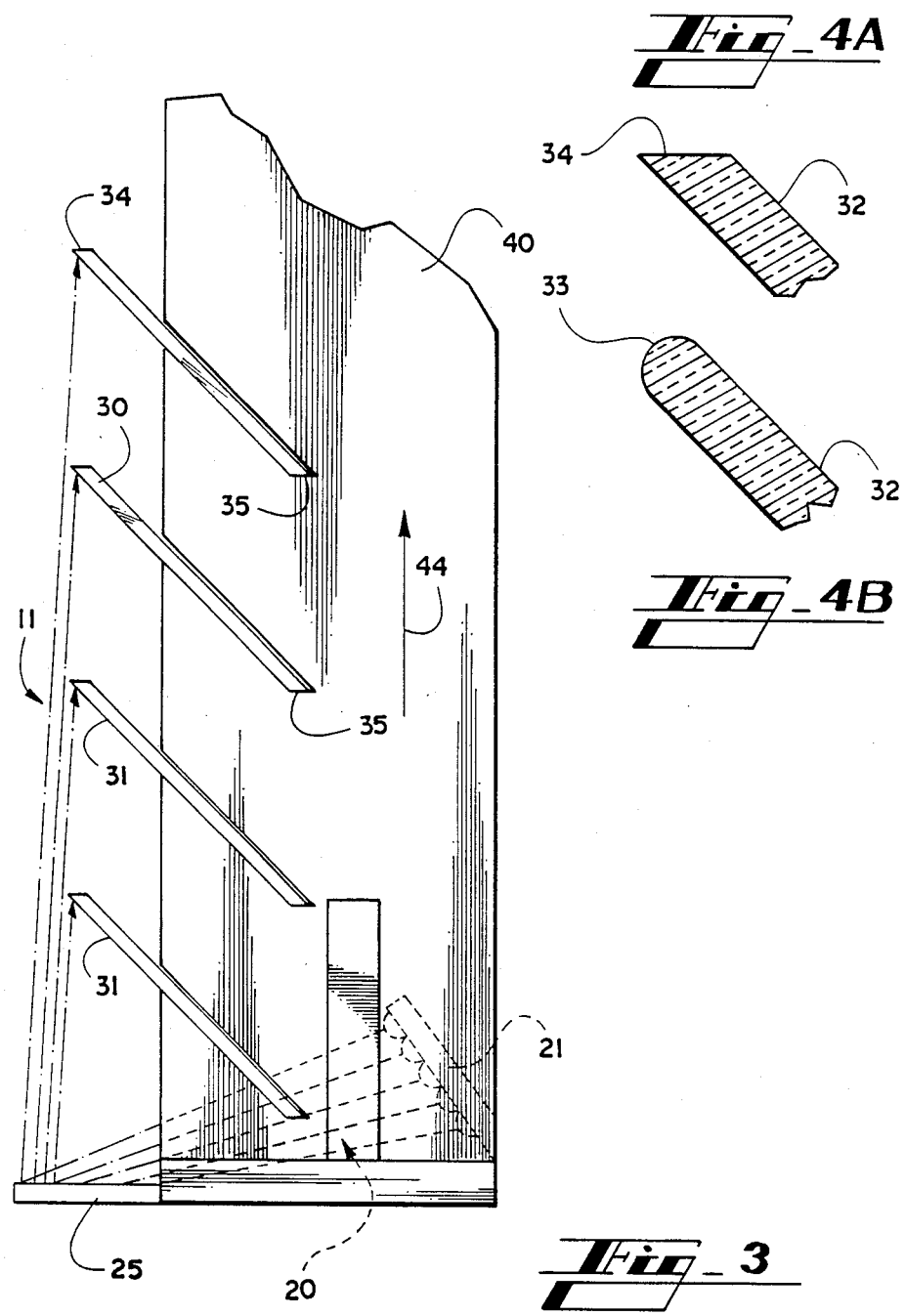

OPTICAL CHROMAKEY FIELD

TECHNICAL FIELD

This invention relates generally to video apparatus, and more particularly relates to an improved method and apparatus for causing a video camera to produce a video signal to selectively cue special effects without undermining the illusions created by the special effects.

BACKGROUND OF THE INVENTION

Video presentations are often augmented with special effects to entertain, inform or otherwise capture the interest of viewers. One method of generating special effects is known as chromakeying. By this method, an opaque backdrop is provided in the field of view of the video camera where the special effects are desired. The backdrop may comprise a curtain, screen or wall, but it must be uniformly colored, usually in a shade of blue or green. When special effects are desired to appear in the video presentation, the special effect images are electronically substituted for the color signals representing the images of the opaque backdrop. Thus, wherever a signal representing the opaque backdrop appears in the video presentation, a corresponding signal representing the special effect will be substituted therefor. In this way, the special effects will appear in the video presentation in place of the opaque backdrop.

The method of adding special effects through chromakeying has been extensively used in television broadcasting. For example, during the broadcast of a weather report, the viewer is presented with the illusion of a television personality standing in front of a weather map. This illusion is created by positioning the television personality in front of a uniformly colored opaque backdrop. The video camera generates a video signal corresponding to the color of the backdrop. The video signal generated by the camera goes to known video control apparatus which reads the signals corresponding to the opaque backdrop and substitutes therefor corresponding signals representing the weather map. Thus, the viewer sees the television personality standing in front of a weather map rather than an opaque backdrop.

As explained above, chromakeying substitutes a special-effect video signal for a corresponding opaque backdrop signal of a certain color. Therefore, care must be taken to avoid including anything in the field of view of the camera which is close to the color of the opaque background. Dressing a television personality in colors close to the color of the opaque backdrop may cause a substitution of the special effects in an undesired area, thereby destroying the special effect illusion. Blues and greens are the colors of choice for opaque backdrops because they are the colors most opposite flesh tones on the color wheel. The use of blue or green in connection with the backdrop creates a sharper image in the video presentation of such areas as a broadcaster's face and hands, and minimizes the possibility of a special effects overlap in these areas.

Although chromakeying offers the benefits of augmenting a video presentation with special effects, the use of an opaque backdrop has several drawbacks. First, the opaqueness of the backdrop creates certain problems. If chromakeying is not used to mat the opaque backdrop with special effects, the opaque backdrop will be part of the video presentation. This may not be aesthetically acceptable. Further, disclosing the existence of the opaque backdrop may destroy or seriously undermine the illusion created by the special effects. Special camera angles may be necessary to avoid including the opaque backdrop in the camera's field of view. This limits the number of available video presentation options. Where time and flexibility are at a premium, such as in unpredictable live television presentations, limiting the camera angles may affect the quality of the video presentation.

In addition, performers in a video presentation must be careful to maintain the illusion created by the special effects despite the difficulties presented by the opaqueness of the backdrop. For example, during a weather report, a weather map may be generated behind the television personality as a special effect. It appears to the viewer that the television personlaity is gesturing with respect to the weather map. However, in the studio, the television personality is gesturing with respect to the opaque backdrop. He or she must look off-camera to a teleprompter or monitor to determine whether his or her gesticulations are accurate. Even the most experienced weather forecaster may look awkward sometimes or otherwise compromise the quality of the presentation in searching for the location of the prompter or monitor off-camera.

In certain video presentations, the special effect of a "window" may be desired. For instance, graphics relating to a news story may be visible in a window positioned relative to the television personality during a news broadcast. It is not possible to limit special effects to a window when an opaque background such as a curtain, screen or wall covering a large area is used.

Another drawback of opaque backdrops is the creation of shadows. During a video presentation, a person or other object may be positioned in front of an opaque backdrop in such a manner that shadows are created on the backdrop. This may affect the backdrop so as to interfere with the substitution of the special-effects signals for the opaque backdrop signals.

Further, an opaque backdrop is usually fixed in location for the duration of the video presentation, or even permanently. Fixing the location of the opaque backdrop generally also fixes the focal length of the video camera. As with the necessity of special camera angles, fixing the location of the opaque backdrop limits the available video presentation options. Futher, fixing the focal length may limit the types of special effects presented in connection with the opaque background. Objects not part of the special effects, such as television personalities, may appear to shrink or swell in connection with changes in the special effects, especially in connection with close-up and zoom presentations.

Accordingly, there is a need in the art for a backdrop for use in connection with video apparatus which is transparent so as to minimize its interference with the video presentation, which is variable in size so as to be suitable for a variety of special effects, and which is readily movable so as to satisfy differing video presentation requirements.

SUMMARY OF THE INVENTION

As will be seen, the present invention satisfies the foregoing criteria. Stated generally, the present invention is a method and apparatus for causing a video camera to produce a video signal to selectively cue special effects and comprises an optical chromakey field including a transparent assembly and an illumination apparatus. The transparent assembly is placed in the field of view of the video camera. The illumination apparatus illuminates the front of the transparent assembly whereby the transparent assembly presents light of a certain of color for reception by the video camera. When special effects are desired, the video control apparatus substitutes a special effect signal for the corresponding signal of light of a certain color presented by the transparent assembly.

Advantageously, the transparency of the transparent assembly permits a person on-camera in front of the transparent assembly to see through the transparent assembly so as to view objects located behind it even while the illumination apparatus is operative. This preserves the illusion of the special effects and enables the television personality to see through the transparent assembly as necessary. For example, during the broadcast of a weather report, a weather map may be generated as the special effect in substitution of the optical chromakey field. Due to the transparency of the assembly, the television personality may look through the assembly to a monitor or teleprompter located behind it for guidance in delivering the report. However, to the viewer, it will appear as if the television personality is looking directly at the weather map. The transparent assembly allows for a more natural appearance in the presentation of weather or news reports in conjunction with special effects such as weather maps or news clips.

The transparency of the optical chromakey field also has other advantages. The optical chromakey field does not ever appear in the video presentation. If the illumination apparatus is operative, either special effects or a background of a certain color will be seen in place of the optical chromakey field in the video presentation. If the illumination apparatus is not operated, the transparency of the transparent assembly will prevent the optical chromakey field from appearing in the video presentation. Further, the transparency of the assembly will allow objects located behind the optical chromakey field to appear in the presentation. Thus, special or awkward camera angles are avoided when using the present invention as it is unnecessary to avoid including the optical chromakey field in the video presentation. Furthermore, the tranparency of the transparent assembly offers the advantage of changing the color of the signals designated for triggering special effects. This allows for more flexibility in dressing the scene of the video presentation. All of the above advantages contribute to sustaining the illusion created by the special effects with the least hindrance and most flexibility.

Stated more specifically, the transparent assembly of the present invention comprises a plurality of transparent members disposed in an array which substantially spans the field of view of the video camera. The transparent members may be supported by a structure located outside the field of view of the video camera. The front surface of the transparent members are angled so that the transparent members operate to present light of a certain color for reception by the video camera. Further, the transparent members are spaced so as to prevent irregularities in the presentation of the light of a certain color for reception by the video camera.

In the preferred embodiment, the transparent members are spaced along an axis of the support structure so that the leading edge of each transparent member overlaps the front surface of the next transparent member in the array. Both the leading and trailing edge of each transparent member may be rounded, or both may be beveled and perpendicular to the plane of the array.

The illumination apparatus of the preferred embodiment of the present invention is located outside the field of view of the camera, and comprises a light source and a reflector panel. The reflector panel is positioned to recieve light from the light source and is operative to reflect light to the transparent assembly. The transparent assembly then presents light of a certain color for reception by the video camera.

Accordingly, it is an object of the present invention to provide an improved method and apparatus for causing a video camera to produce a video signal to selectively cue special effects without undermining the illusions created by the special effects.

It is an object of the present invention to provide an improved method and apparatus comprising an optical chromakey field which is transparent so as to minimize its interference with a video presentation.

It is an object of the present invention to provide an improved method and apparatus comprising an optical chromakey field which is variable in size so as to be suitable for a variety of special effects.

It is an object of the present invention to provide an improved method and apparatus comprising an optical chromakey field which readily movable so as to satisfy differing video presentation requirements.

These and other objects, features, and advantages of the present invention may be more clearly understood and appreciated from a review of the following detailed description of the preferred embodiment and by reference to the appended drawings and claims.

BRIEF DESCRIPTION OF THE DRAWINGS

FIG. 1 is a perspective view illustrating a typical application of the optical chromakey field according to the preferred embodiment of the present invention.

FIG. 2 is a perspective view of the optical chromakey field shown in FIG. 1.

FIG. 3 is a fragmented side view of the optical chromakey field shown in FIG. 1.

FIGS. 4A and 4B are detailed side sectioned views showing alternative embodiments of the leading edges used in the optical chromakey field according to the preferred embodiment of the present invention.

DETAILED DESCRIPTION OF THE PREFERRED EMBODIMENT

Referring now to the drawings, in which like numerals indicate like elements throughout the several figures, FIG. 1 illustrates an optical chromakey field shown generally at 10 according to a preferred embodiment of the present invention, in the environment of a television studio. The optical chromakey field 10 is placed in the field of view of the video camera 5. As illustrated, a television personality 7 such as a weather reporter, stands in front of the optical chromakey field 10 in the field of view of the video camera 5. The optical chromakey field 10 is transparent and allows the television personality 7, when facing the optical chromakey field, to see through the optical chromakey field to the monitor or teleprompter 6 which is located behind the optical chromakey field.

FIG. 2 illustrates the preferred embodiment in greater detail. A perspective view of the optical chromakey field 10 is shown in FIG. 2 from its front side 11, which is the side placed in the field of view of the video camera 5. The optical chromakey field 10 includes a transparent assembly 29 and an illumination apparatus 20. The transparent assembly 29 is in the field of view of the video camera 5. The transparent assembly 29 of the preferred embodiment comprises a plurality of transparent horizontal members 30, which are supported in a vertical array by a support structure 40. In the preferred embodiment, these transparent members 30 are flat louvers of equal length, width and thickness. However, the length, width, thickness and number of the members used in the optical chromakey field 10 may be varied according to the particular needs of the video presentation. For example, for a weather report a wall-size optical chromakey field 10 may be used to present the special effect of a weather map across the entire background of the video presentation. The optical chromakey field 10 may have a smaller configuration and be placed in different locations depending upon the intended special effects. For instance, for a window effect such as is used in showing news clips over a reporter's shoulder during a newscast, shorter and fewer transparent members 30 would be necessary to achieve the desired effect within the apparent window. The optical chromakey field 10 for such a newscast would be placed in the camera's field of view so that the news clips appear in the correct place. The thickness of each transparent member in the preferred embodiment is ¾ of an inch, but thicker members may be necessary in other embodiments to prevent bowing where the optical chromakey field 10 is large and the length of each transparent member is long. The transparent members 30 of the preferred embodiment are made of plexiglass, but they may be made of other transparent materials known to those skilled in the art, such as glass, acrylic or other plastics.

As illustrated in FIG. 2, the transparent members 30 of the preferred embodiment are arranged in a vertical array and supported by a support structure 40. The support structure 40 of the preferred embodiment comprises two vertical walls 41A and 41B connected at their respective interior rear upper corners to a spacing rod 42. For additional support, the vertical walls 41A and 41B may be connected at their respective interior rear lower corners or elsewhere so long as such support does not interfere with the transparency of the optical chromakey field 10. Each of the vertical walls 41A and 41B is further supported in the preferred embodiment by a stabilizer, 43A and 43B, which is connected along the base width of each wall to lend greater vertical stability. Alternate forms of supporting the transparent members 30 without interfering with the transparency of the optical chromakey field 10 are well known to those skilled in the art.

Each of the transparent members 30 of the preferred embodiment has a front surface 31, a leading edge 32 and a trailing edge 35. The transparent members 30 are supported by the support structure 40 so that the front surface 31 of each transparent member 30 is at an angle with respect to the vertical axis 44 of the structure 40. The transparent members 30 are angled so that they operate together with the illumination apparatus 20 to present light of a certain color for reception by the video camera 5.

FIG. 3 illustrates the angled transparent members 30 in greater detail. The transparent members 30 of the preferred embodiment are angled at approximately 45 degrees with respect to the vertical axis 44 of the support structure 40, with the front surface 31 of each transparent member facing downwardly. However, this angle may be varied in a manner well known to those skilled in the art according to the circumstances necessary to present light of a certain color for reception by the video camera 5.

FIG. 3 also illustrates the illumination apparatus 20 of the preferred embodiment. The depicted illumination apparatus 20 comprises a light source 21 and a reflector panel 25. The reflector panel 25 is positioned to lie flat in front of the angled transparent members 30 at the foot of the vertical array so as to receive light from the light source 21 and to reflect light to the transparent assembly 29. Although the light source 21 of the preferred embodiment is an array of fluorescent tubes, any other kind of lighting means may be used if it satisfies the requirements of the present invention.

The light source 21 is positioned between the vertical walls 41A and 41B and behind the lowermost transparent member 30, and directs illumination forwardly through the lowermost transparent member to strike the reflector panel 25. The angular relation between the downwardly-facing front surface 31 of each angled transparent member 30, the flat reflective panel 25, and the light source 25 is chosen so that each front surface 31 receives reflected illumination from the light source 25 whenever that source is turned on. The reflector panel 25 of the preferred embodiment is a blue reflector panel which receives light from the light source 21, but reflects only blue light towards the front surfaces 31 of the transparent members 30. The front surfaces 31 in turn reflect the blue light for reception by the video camera 5. This causes the video camera 5 to produce a characteristic video signal operative to cue special effects.

Thus, in operation, the optical chromakey field is 10 placed in the field of view of the video camera 5 where it does not interfere with the video presentation because of its transparency. In the preferred embodiment, the light source 21 directs light towards the blue reflector panel 25. The blue reflector panel 25 receives the light, but reflects only blue light towards the front surfaces 31 of the transparent members 30. The transparent members 30 of the preferred embodiment are angled at approximately 45 degrees with respect to the vertical axis 44 of the support structure 40. Each front surface 31 faces downwardly. Thus, blue light directed by the reflector panel 25 towards the angled front surfaces 31 of the transparent members 30 is reflected by the front surfaces for reception by the video camera 5. When special effects are desired, the video control apparatus substitutes a special effect signal for the corresponding blue light signal presented by the transparent assembly 29. The viewer of the video presentation sees special effects in place of the optical chromakey field 10. Nevertheless, the transparency of the transparent assembly 29 allows the on-camera television personality 7 to see through the optical chromakey field 10 to view a teleprompter or monitor 6 as necessary.

It will be understood to those skilled in the art that the light source 21 may be specialized so as to provide blue light to the reflector panel 25 to be reflected to the transparent assembly 29. Alternatively, the light source 21 may provide blue light directly illuminating the transparent assembly 29 without requiring a reflector panel 25. As another alternative, the front surfaces 31 of the transparent members 30 may be configured or treated so as to reflect only blue light.

While the preferred embodiment uses blue light, it will be understood to those skilled in the art that other colors may be designated to cue special effects. Blue and green colors are chosen generally because they are most opposite flesh tones on the color wheel, and thus allow for the greatest flexibility in creating special effects.

Further, FIG. 3 illustrates that the transparent members 30 are spaced so as to prevent irregularities in the presentation of the light of a certain color for reception by the video camera. Gaps between the transparent members 30 may pass through some of the light from the illumination apparatus 20. This may result in the presentation of a striped or otherwise irregular pattern of light of a certain color for reception by the video camera 5. The transparent members 30 of the preferred embodiment are spaced along the vertical axis 44 of the support structure 40 so that the leading edge 32 of each transparent member 30 overlaps the front surface 31 of the next transparent member 30 in the array. This overlap provides that the optical chromakey field 10 presents a uniform surface to the video camera 5 without any gaps which might cause stripes or other aberrations to appear in the video presentation.

FIGS. 4A and 4B illustrate two embodiments of a leading edge 32 or a trailing edge 35 of a transparent member 30. The leading edge 34 of the preferred embodiment is shown in FIG. 4A. The leading edge 34 is beveled and its flatness is perpendicular with respect to the plane of the array. The beveled edge 34 thus is substantially parallel to the sight lines of the video camera 5, and any light reflected from those edges will not strike the camera lens. If the leading edge 34 is beveled, the trailing edge 35 should also be beveled and perpendicular to the plane of the array. This prevents stripes or other irregularities from appearing in the presentation. FIG. 3 illustrates beveled leading edges 34 and beveled trailing edges 35. An alternative embodiment utilizing a rounded leading edge 33 is shown in FIG. 4B. A rounded leading edge 33 requires a rounded trailing edge (not shown). The rounded edges lack any plane surface which could reflect light to the camera. Rounded or beveled leading edges thus are provided by the present invention to minimize the amount of light which is scattered away from its directed path towards the video camera 5. A rounded or a beveled edged will also minimize the problems of reflection or glare created by ambient light which may affect the quality of the video presentation.

The preferred embodiment of the present invention has been disclosed by way of example and it will be understood that other modifications may occur to those skilled in the art without departing from the scope and the spirit of the appended claims.

I claim:

1. Apparatus for causing a video camera to produce a video signal to selectively cue a special effect, comprising:
   transparent means having a front side for placement in the field of view of a video camera, having a back side, and being transparent so as to permit visual sighting from the front side of objects located behind the means; and
   illumination means selectively operative to illuminate the transparent means;
   whereby the transparent means presents light of a certain color for reception by the video camera selectively causing the video camera to produce a characteristic video signal operative to cue the special effect while permitting a person on-camera in front of the transparent means to see through the transparent means so as to view objects located behind the transparent means.

2. Apparatus as in claim 1, wherein:
   the transparent means comprises a plurality of transparent members disposed in an array substantially spanning the field of view of the camera; and
   the transparent members have front surfaces angled whereby the transparent members present light of a certain color for reception by the video camera.

3. Apparatus as in claim 2, wherein the tranparent members are spaced so as to prevent irregularities in the presentation of light of a certain color for reception by the video camera.

4. Apparatus as in claim 2, wherein the transparent members have leading edges, each of which overlaps the front surface of the next transparent member in the array, and have trailing edges.

5. Apparatus as in claim 4, wherein the leading edges and the trailing edges of the transparent members are rounded so as to minimize the amount of light scattered away from its directed path towards the video camera.

6. Apparatus as in claim 4, wherein the array defines a plane and the leading edges and trailing edges of the transparent members are beveled and perpendicular to the plane of the array so as to minimize the amount of light scattered away from its directed path towards the video camera.

7. Apparatus as in claim 4, further comprising:
   a support means for supporting the transparent members in the array.

8. Apparatus as in claim 7, wherein:
   the transparent members are spaced along the support means so that the leading edge of each transparent member overlaps the front surface of the next transparent member in the array.

9. Apparatus as in claim 1, wherein the illumination means operates to illuminate the transparent means with light of a certain color.

10. Apparatus as in claim 1, wherein:
    the illumination means comprises a light source and a reflection means positioned to receive light from the light source and operative to reflect the light to the transparent means.

11. Apparatus as in claim 10, wherein the light source provides light of a certain color.

12. Apparatus as in claim 10, wherein the reflection means reflects light of a certain color.

13. A method for causing a video camera to produce a video signal to selectively cue special effects, comprising the steps of:
    positioning a transparent means having a front side in the field of view of a video camera, the transparent means being transparent so as to permit visual sighting from the front side of objects located behind the transparent means;
    selectively illuminating the transparent means whereby light of a certain color is presented by the transparent means for reception by the video camera; and
    selectively causing the video camera to produce a characteristic video signal operative to cue special effects while permitting a person on-camera in front of the transparent means to see through the transparent means so as to view objects located behind the transparent means.

14. The method of claim 13, wherein the step of selectively illuminating the transparent means comprises:

illuminating the transparent means with light of a certain color.

15. The method of claim 14, wherein the step of illuminating the transparent means with light of a certain color comprises:

operating a lighting means and a reflection means.

16. The method of claim 15, wherein the step of operating a lighting means and a reflection means comprises:

operating the lighting means to provide light of a certain color.

17. The method of claim 15 wherein the step of operating a lighting means and a reflection means comprises:

operating a reflection means to reflect light of a certain color.

* * * * *